US010306056B1

(12) United States Patent
Nguyen

(10) Patent No.: US 10,306,056 B1
(45) Date of Patent: *May 28, 2019

(54) SYSTEM, METHOD, AND COMPUTER READABLE MEDIUM FOR ESTABLISHING COMMUNICATION BETWEEN DEVICES

(71) Applicant: OPEN INVENTION NETWORK LLC, Durham, NC (US)

(72) Inventor: Kevin V. Nguyen, Allen, TX (US)

(73) Assignee: OPEN INVENTION NETWORK LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,142

(22) Filed: Jun. 11, 2018

Related U.S. Application Data

(63) Continuation of application No. 15/445,594, filed on Feb. 28, 2017, now Pat. No. 9,998,592, which is a continuation of application No. 14/676,350, filed on Apr. 1, 2015, now Pat. No. 9,591,128, which is a continuation of application No. 14/089,459, filed on Nov. 25, 2013, now Pat. No. 9,025,749, which is a continuation of application No. 11/389,571, filed on Mar. 27, 2006, now Pat. No. 8,619,960.

(51) Int. Cl.
H04M 3/42 (2006.01)
H04M 1/64 (2006.01)
H04W 4/16 (2009.01)
G06F 17/30 (2006.01)
H04L 29/06 (2006.01)
H04M 7/00 (2006.01)
H04L 29/08 (2006.01)
G06F 16/903 (2019.01)

(52) U.S. Cl.
CPC .. *H04M 3/42306* (2013.01); *G06F 16/90335* (2019.01); *G06F 17/30979* (2013.01); *H04L 65/1069* (2013.01); *H04L 67/02* (2013.01); *H04M 3/42* (2013.01); *H04M 3/42042* (2013.01); *H04M 7/009* (2013.01); *H04W 4/16* (2013.01); *H04M 3/42314* (2013.01)

(58) Field of Classification Search
CPC . H04L 65/1069; H04M 3/42; H04M 3/42042; H04M 3/42314; H04M 7/009
USPC ................ 379/88.19, 88.21, 201.01, 201.02
See application file for complete search history.

(56) References Cited

U.S. PATENT DOCUMENTS

| | | | | |
|---|---|---|---|---|
| 7,634,809 B1* | 12/2009 | Schneider | ........... | H04L 63/1416 726/22 |
| 8,619,960 B1* | 12/2013 | Nguyen | ............ | H04M 3/42306 379/201.01 |
| 9,025,749 B1* | 5/2015 | Nguyen | ............ | H04M 3/42306 379/201.01 |
| 9,591,128 B1* | 3/2017 | Nguyen | ............ | H04M 3/42306 |
| 9,998,592 B1* | 6/2018 | Nguyen | ............ | H04M 3/42306 |

(Continued)

*Primary Examiner* — Khai N. Nguyen

(57) ABSTRACT

A system, method, and computer readable medium for establishing communication between two devices comprises connecting, by a first computer, to an open source Private Branch Exchange (PBX) platform via a port, receiving a phone number sent by a first one of the two devices at the open source PBX platform, invoking an interface module by the open source PBX platform, where the interface module resides on the open source PBX platform, and building a Calling Name request by the interface module related to the received phone number.

20 Claims, 1 Drawing Sheet

(56) References Cited

U.S. PATENT DOCUMENTS

| | | | |
|---|---|---|---|
| 2002/0094070 A1* | 7/2002 | Mott | H04M 15/00 379/133 |
| 2003/0028577 A1* | 2/2003 | Dorland | G06F 9/542 718/100 |
| 2003/0219109 A1* | 11/2003 | Malik | H04L 51/04 379/142.01 |
| 2004/0180621 A1* | 9/2004 | Fowler | H04L 29/06027 455/39 |
| 2004/0190495 A1* | 9/2004 | White | H04L 29/06027 370/352 |
| 2004/0194102 A1* | 9/2004 | Neerdaels | H04L 29/06 718/100 |
| 2004/0218743 A1* | 11/2004 | Hussain | H04M 3/42153 379/201.11 |
| 2005/0025128 A1* | 2/2005 | Chiu | H04M 7/128 370/352 |
| 2005/0117730 A1* | 6/2005 | Mullis | H04M 3/54 379/210.02 |
| 2005/0243973 A1* | 11/2005 | Laliberte | H04M 11/04 379/37 |
| 2006/0187900 A1* | 8/2006 | Akbar | H04M 7/0066 370/352 |
| 2006/0291411 A1* | 12/2006 | Varland | H04M 3/42008 370/328 |
| 2007/0064906 A1* | 3/2007 | Jain | H04M 3/42042 379/207.05 |
| 2007/0298842 A1* | 12/2007 | Kamada | G06F 17/30905 455/566 |
| 2008/0139186 A1* | 6/2008 | Ringland | H04M 1/2745 455/415 |

* cited by examiner

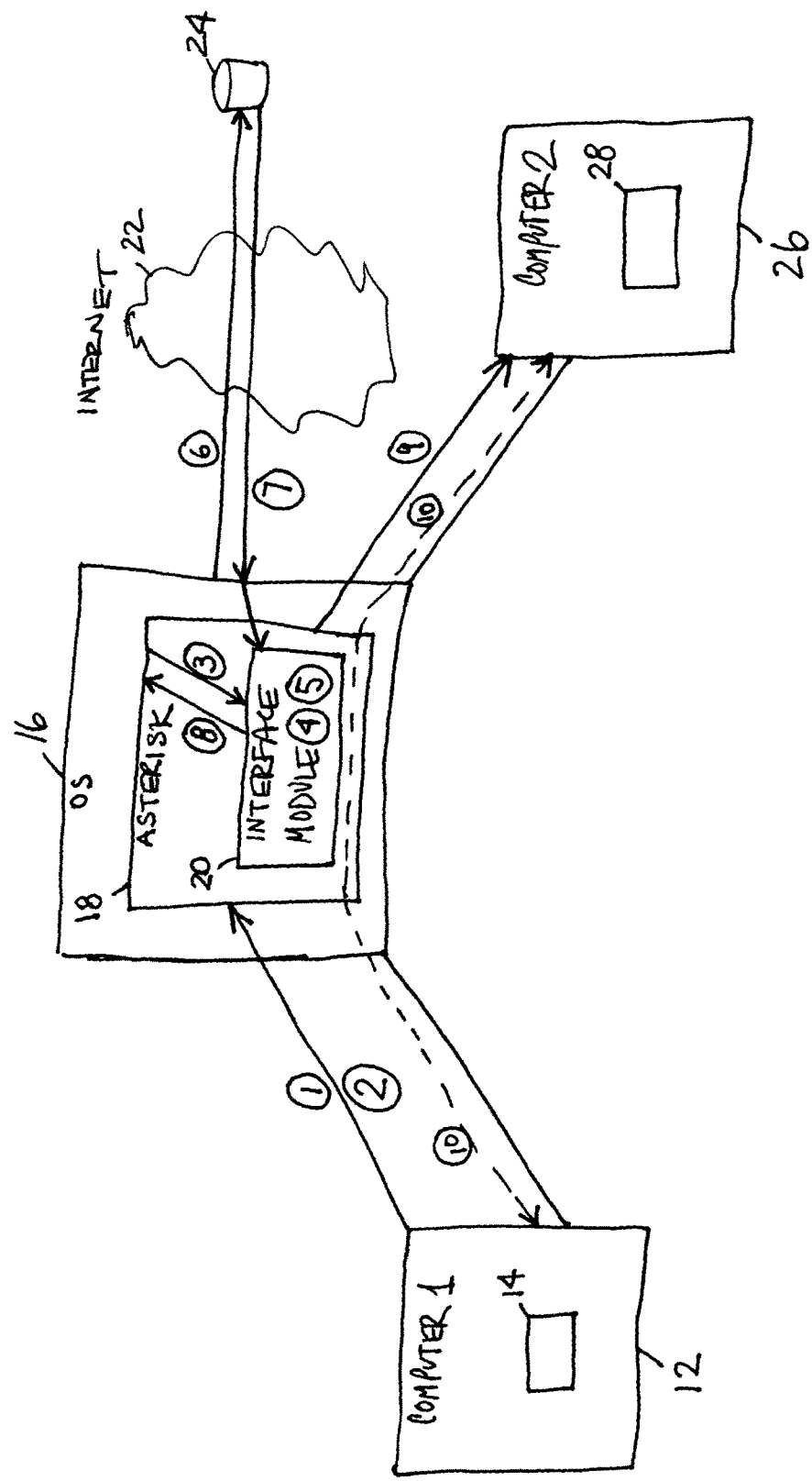

SYSTEM, METHOD, AND COMPUTER READABLE MEDIUM FOR ESTABLISHING COMMUNICATION BETWEEN DEVICES

CROSS-REFERENCE TO RELATED APPLICATIONS

The present invention is a continuation of U.S. patent application Ser. No. 15/445,594, filed on Feb. 28, 2017, titled SYSTEM, METHOD, AND COMPUTER READABLE MEDIUM FOR ESTABLISHING COMMUNICATION BETWEEN DEVICES, now issued U.S. Pat. No. 9,998,592, issued on Jun. 12, 2018, which is a continuation of U.S. patent application Ser. No. 14/676,350, filed on Apr. 1, 2015, titled SYSTEM, METHOD, AND COMPUTER READABLE MEDIUM FOR ESTABLISHING COMMUNICATION BETWEEN DEVICES, now issued U.S. Pat. No. 9,591,128, issued on Mar. 7, 2017, which is a continuation of U.S. patent application Ser. No. 14/089,459, filed on Nov. 25, 2013, titled SYSTEM, METHOD, AND COMPUTER READABLE MEDIUM FOR ESTABLISHING COMMUNICATION BETWEEN DEVICES, now issued U.S. Pat. No. 9,025,749, issued on May 5, 2015, which is a continuation of U.S. patent application Ser. No. 11/389,571, filed on Mar. 27, 2006, now issued U.S. Pat. No. 8,619,960, issued on Dec. 31, 2013, titled SYSTEM, METHOD, AND COMPUTER READABLE MEDIUM FOR ESTABLISHING COMMUNICATION BETWEEN DEVICES, the entire contents of each of which are enclosed by reference herein.

FIELD OF THE INVENTION

The present invention relates generally to communications, and, more particularly, to a system, method, and computer readable medium for establishing communication between devices.

BACKGROUND OF THE INVENTION

The ability to establish communication between devices has been prevalent for some time. With the usage of open source software, this ability can be enhanced and can offer a number of advantages prior art systems could not. Such advantages include lower implementation and usage costs as well as enhanced functionality that can be offered via unique applications.

As such, what is needed is a system, method, and computer readable medium that can provide such advantages.

SUMMARY OF THE INVENTION

The present invention provides a system, method, and computer readable medium for establishing communication between devices. In one embodiment, a method for establishing communication between two devices comprises connecting, by a first computer, to an open source Private Branch Exchange (PBX) platform via a port, receiving a phone number sent by a first one of the two devices at the open source PBX platform, invoking an interface module by the open source PBX platform, where the interface module resides on the open source PBX platform, and building a Calling Name request by the interface module related to the received phone number.

In another embodiment, a computer readable medium comprises instructions for connecting to an open source platform via a port, receiving a phone number at the open source platform, invoking an interface module by the open source platform, wherein the interface module resides on the open source platform, building a request by the interface module related to the received phone number, calling a function, by the interface module, based on the request, sending the request, by the function, to a database, and receiving a response at the interface module.

In a further embodiment, a system for establishing communication between two devices comprises a server comprising: an open source Private Branch Exchange (PBX) platform, and an interface module, wherein the open source PBX platform: receives a phone number sent by a first device, invokes the interface module, wherein the interface module: builds a request related to the received phone number, calls a function based on the request which sends the request to a database, and receives a response which establishes communication between at least two devices operably coupled to the server.

BRIEF DESCRIPTION OF THE DRAWINGS

FIG. 1 depicts a diagram of a system in accordance with a preferred embodiment of the present invention.

DETAILED DESCRIPTION OF THE INVENTION

The present invention provides the ability to establish communication between at least two devices such as between two computers, between a computer and a server, between a computer and a cellular phone or Internet Protocol (IP) enabled phone, between a computer and another IP device, between two IP devices, between two mobile devices, or between two or more devices that can receive and/or transmit information.

The present invention further utilizes certain open source software in a unique manner as well as other unique information related to a caller, a phone number, or other identifier or information to assist in the establishing of such communication.

Referring now to FIG. 1, a system 10 of the present invention includes a first computer 12 with phone calling software or capability 14 and a server 16 running an operating system (such as the Linux operating system) that includes a communications platform 18 (such as the Asterix software or platform) which includes an interface module 20. Asterisk is an open-source Private Branch Exchange (PBX) software application that runs on various operating systems and provides all of the features you would expect from a PBX and more. Asterisk provides Voice over IP (VoIP) in many protocols, and can interoperate with almost all standards-based telephony equipment using relatively inexpensive hardware. Asterisk provides voicemail services with Directory, Call Conferencing, Interactive Voice Response and Call Queuing. It has support for three-way calling, caller ID services, ADSI, SIP and H.323 (as both client and gateway).

The system 10 further includes a data network 22 (such as the Internet), a database 24 and second computer 26 with phone calling software or capability 28. A number of different devices may be utilized instead of a computer such as a cellular phone, a laptop computer, a personal digital assistant, an email-messaging device, or any electronic device capable of sending and/or receiving information, without departing from the scope of the present invention. Further, although depicted as physical connections (such as VoIP connections), the first computer 12, the server 16, the data network 22, the database 24 and the second computer 26 may send and/or receive information wirelessly.

In operation, the first computer 12 connects (1) to the Asterisk platform 18 via an IP port (not shown). The Asterisk software "listens in" or monitors the port for any activity. A phone number is entered into the phone calling software or capability 14 and that phone number is sent (2) to the Asterisk platform 18 via the port. In other embodiments, other data can be entered such as an email address or other identifier which may or may not be translated into a phone number without departing from the scope of the present invention. The Asterisk platform 18 then calls or invokes (3) the interface module 20 which builds (4) a request to provide a Calling Name (CNAM) related to the entered phone number. CNAM service, such as that provided by Accudata Technologies, Inc., retrieves stored names associated with a telephone number. This allows exchange carriers and wireless providers to display a name from an inbound call originating anywhere in the North American Numbering Plan area. In the present invention, utilizing Asterisk, VoIP service providers can deliver Calling Name for Caller ID devices that are IP enabled.

The server 16, can accept a number of query types such as:

a CNM2 or CNAME transaction type which returns a Calling Name;

a TBNA transaction type which returns Name & Address data;

a WTN transaction type which checks for a Working Telephone Number;

a BNS transaction type which returns LIDB raw data; and a CC1 transaction type which returns Local Exchange Carrier (LEC) Calling Card data.

The request is preferably an https request (but can be another type of request) and an example of such a request appears below for each of the query types:
CNM2 Example:
https://www.accudatatech.us/ACNM122104/servlet/query?&Cust=XXXXXXXX&OID=000000000000000
0009&TransType=CNM2&BTN=9723902610
TBNA Example:
http://www.accudatatech.us/ACNM122104/servlet/query?&Cust=XXXXXXXX&OID=0
00000000000000019&TransType=TBNA&BTN=9723902610
Working Telephone Number (WTN) Example:
https://www.accudatatech.us/LIDB080304/servlet/query?&Cust=XXXXXXXX&OID=0
00000000000000009&TransType=WTN&BTN=9723902610
LIDB Raw Data (BNS) Example:
https://www.accudatatech.us/LIDB080304/servlet/query?&Cust=XXXXXXXX&OID=0
00000000000000009&TransType=BNS&BTN=9723902610
CC1 Example:
http://www.accudatatech.us/LIDB080304/servlet/query?&Cust=XXXXXXXX&OID=00
00000000000000009&TransType=CC1&BTN=97239026101234

In the above requests:

CUST is a customer number that is issued by the CNAM service provider to identify who the customer is;

OID is a unique alphanumeric ID issued by a user of the present invention.

For example,
the OID can reflect a particular query request;
BTN or Bill To Number is a ten digit phone number; and
ACNM122104 and LIDB080304 is an example of a folder name that the application or software of the present invention resides in.

The following paragraphs describe in more detail the query (or transaction) types.

WTN Transaction Type

When the server receives a 10 digits phone number with type WTN, it sends the number to the LIDB to determine if the number is a working telephone number. If the LIDB returns a valid response then the sent phone number is a working number, or "Active". Other LIDB responses will be determined if the number is "Unknown" or "Inactive". The reply field contains "Active", "Inactive", or "Unknown". The verbal field identifies any error message if any.

The server returns the data in the following format for an active Telephone Number: HTTP Response Status Header: 200 OK
HTTP Body Content:
Response for 2149227066:
Cust=XXXXXXXX&OID=0000000000000000012&Type=WTN&BTN=2149227066& Reply=Active&Verbal=
Response for an unknown number, 9285566732:
Cust=IN_HOUSE&OID=0000000000000000012&Type=WTN&BTN=9285566732&Reply=Unknown&Verbal=
Response for an inactive number, 9721234000:
Cust=IN_HOUSE&OID=0000000000000000012&Type=WTN&BTN=9721234000&Reply=Inactive&Verbal=
Input Field Definitions:
Cust: 8 bytes
OID: 19 bytes unique id
TransType: 3 bytes
BTN: 10 digits phone number
Output Field Definitions:
Cust: 8 bytes
OID: 19 bytes unique id
Type: 3 bytes
BTN: 10 digits phone number
Reply: "Active", "Inactive", or "Unknown"
Verbal:
Not Found—The LIDB where the number is supposed to be stored does not have information about the number
Time Out—No response from LIDB within the millisecond threshold
Link down—Network problem, please call Accudata
Not in LIDB—There is not any routing information to a LIDB. The number is not routable.

CNM Transaction Type

The server returns the following data in the reply field: Generic Name, Availability, Presentation.

Generic Name: Calling Name

The value for Availability and Presentation fields are as follow:
Availability: 0—Name available
1—Name not available
2—For Future use
3—No response from CNAME database
4—The phone number is not routable
5—With the following values:
1. "City State" ex: "Queens NY"
2. City State ex: Denver Colo. //2 spaces between City and State
3. State Call ex: Michigan Call
4. City State ex: Portland Oreg. //1 space between City and State
6—With the following values:
NOT PROVIDED
WIRELESS
PAY PHONE
PAYPHONE,
CELLUL, CELLULA, or CELLULR on the right most
CELLULAR on the left most.

Presentation: 0—Allowed
    1—Restricted
    2—For Future use
Response for 2146440557:
    HTTP Response Status Header: 200 OK
    HTTP Body Content:
Cust=XXXXXXXX&OID=0000000000000000009&
Type=CNM&BTN=2146440577& Reply=REVNUE COMMUNI,0,0&Verbal=
Response for 6167969758:
Cust=XXXXXXXX&OID=0000000000000000009&
Type=CNM&BTN=6167969758& Reply=MICHIGAN CALL,5,0&Verb al=
Response for 5123966648:
Cust=XXXXXXXX&OID=0000000000000000009&
Type=CNM&BTN=5123966648& Reply=,3,0&Verb al=Not Found
Input Field Definitions:
    Cust: 8 bytes
    OID: 19 bytes unique id
    TransType: 3 bytes
    BTN: 10 digits phone number
Output Field Definitions:
    Cust: 8 bytes
    OID: 19 bytes unique id
    Type: 3 bytes
    BTN: 10 digits phone number
    Reply: Generic Name,Availability,Presentation
    Generic Name: 15 bytes
    Availability: 1 byte
    Presentation: 1 byte
    Verbal:
    Not Found—The LIDB where the number is supposed to be stored does not have information about the number
    Time Out—No response from LIDB within the millisecond threshold
    Link down—Network problem, please call Accudata
    Not in LIDB—There is not any routing information to a LIDB. The number is not routable.
BNS Transaction Type
For transaction type of BNS, the server returns the following data (comma separated) in the reply field: Account Owner, Billing Service Provider, Collect Acceptance Indicator, Intercept Indicator, OCN, RAO, Record Status Indicator, Service/Equipment Indicator, Third Number Acceptance Indicator, Treatment Indicator.
Response for 2146440557:
HTTP Response Status Header: 200 OK
HTTP Body Content:
Cust=XXXXXXXX&OID=0000000000000000009&
Type=BNS&BTN=2146440577&R eply=2152,3,1,2313,998,1,1,6,1&Verbal=
Response for 6167969758:
Cust=XXXXXXXX&OID=0000000000000000009&
Type=BNS&BTN=6167969758&R eply=, , , , , , , ,&Verbal=No Found
Response for 6105858256:
Cust=XXXXXXXX&OID=0000000000000000009&
Type=BNS&BTN=6105858256&R eply=, , , , , , , ,&Verbal=Not in LIDB
Input Field Definitions:
    Cust: 8 bytes
    OID: 19 bytes unique id
    TransType: 3 bytes
    CardNum: 10 digits phone number
Output Field Definitions:
    Cust: 8 bytes
    OID: 19 bytes unique id
    Type: 3 bytes
    Reply: 10 comma-separated fields. The order of the data is:

| Field | Length |
| --- | --- |
| 1. Account Owner | 4 bytes (alphanumeric) |
| 2. Billing Service Provider | 3-4 bytes (alphanumeric) |
| 3. Collect Acceptance Indicator | 1-2 bytes |
| 4. Intercept Indicator | 1-2 bytes |
| 5. OCN | 4 bytes |
| 6. RAO | 3-4 bytes |
| 7. Record Status Indicator | 1-2 bytes |
| 8. Service/Equipment Indicator | 1-2 bytes |
| 9. Third Number Acceptance Indicator | 1-2 bytes |
| 10. Treatment Indicator | 1-2 bytes |

Verbal:
    Not Found—The LIDB where the number is supposed to be stored does not have information about the number
    Time Out—No response from LIDB within the millisecond threshold
    Link down—Network problem, please call Accudata
    Not in LIDB—There is not any routing information to a LIDB. The number is not routable.
    CC1 Transaction Type
    The server returns the following data in the reply field: CSDI, CCASN, PSDI, PIN Restriction Indicator, Company ID, Record Status Indicator, RAO, Account Owner, BSP.
Response for Calling Card of 9723902610, pin=1234:
HTTP Response Status Header: 200 OK
HTTP Body Content:
Cust=XXXXXXXX&OID=0000000000000000009&
Type=CC1&BTN=9723902610123 4&Reply=, , , , , , , ,&Verbal=Not Found
    Response for 9036755151, pin=XXXX:
Cust=XXXXXXXX&OID=0000000000000000009&
Type=CC1&BTN=9036755151XX XX&Reply=2,01, 1, 1,0001, 1,497,2084,&Verbal=
Response for 9721234000, pin=1234:
Cust=XXXXXXXX&OID=0000000000000000009&
Type=CC1&BTN=9721234000012 34&Reply=, , , , , , , ,&Verbal=Not in LIDB
    Input Field Definitions:
        Cust: 8 bytes
        OID: 19 bytes unique id
        TransType: 3 bytes
        BTN: 10 digits phone number+4 digits pin
    Output Field Definitions:
        Cust: 8 bytes
        OID: 19 bytes unique id
        Type: 3 bytes
        BTN: 14 bytes
        Reply: 9 comma-separated fields. The order of the data is:

| Field | Length |
| --- | --- |
| 1. Calling Card Service Denial Indicator | 1-2 bytes |
| 2. Calling Card Sub-Account Number | 1-20 bytes |
| 3. Pin Service Denial Indicator | 1-2 bytes |
| 4. Pin Restriction Indicator | 1-2 bytes |
| 5. Company Id | 4 bytes |
| 6. Record Status Indicator | 1-2 bytes |

-continued

| Field | Length |
|---|---|
| 7. RAO | 3-4 bytes (alphanumeric) |
| 8. Account Owner | 4 bytes (alphanumeric) |
| 9. Billing Service Provider | 3-4 bytes (alphanumeric) |

Verbal:
Not Found—The LIDB where the number is supposed to be stored, does not have information about the number
Time Out—No response from LIDB within the millisecond threshold
Link Down—Network problem, please call.
Not in LIDB—There is not any routing information to a LIDB. The number is not routable.
Reply Fields Definitions:
CSDI: indicates the reason the account number was denied:
   1—No Pins assigned
   2—No service denial
   3—Service denial
CCANS: contains the code used on a customer's bill to distinguish the various users of an account number of a Calling Card, each associated with a different PIN:
   Example: 01—$1^{st}$ account
PSDI: indicates the reason the PIN was denied:
   1—No service denial
   2—Service denial on PIN due to threshold exceeded
   3—Service denial on PIN due to nonpayment
   4—Service denial on PIN due to service restriction
PIN Restriction Indicator: whether or not a PIN is restricted:
   0—Screened data
   1—Unrestricted PIN
   2—Restricted PIN
   3—N-Number Restriction
   4—Domestic Restriction
   5—Reserved
Company ID: Identifies the telephone company with which the data is to be associated.
Record Status Indicator: Provides status information regarding a particular record:
   0—Screened data
   1—stable record—BNA available
   2—stable record—BNA not available
   3—transitional record—BNA available
   4—transitional record—BNA not available
   5—default record—BNA available
   6—default record—BNA not available
RAO: Revenue Account Office
Account Owner: Specifies the identity of AO.
Billing Service Provider: Specifies the identity of the Billing Service Provider.
Logic to verify valid Calling Card:
The fields to use and the order of checking are CSDI, PSDI, and PIN
Restriction Indicator.
TBNA Transaction Type
The server returns the following data fields (in bold):
Cust=XXXXXXXX&OID=0000000000000000001&
Type=TBNA&BTN=9723902610&LastName=ACCU DATATECH&FirstName=&Address=206 McDermott Dr&City=Allen&State=TX&ZipCode=75013&Verbal=
For a business address, the name of the business is in the LastName field.

When the telephone number provided is not enough information to generate a complete address, a question mark is generated. An example of the most common case is: the correct street address is "131 N MAIN ST" but the system can only determine that the primary address is an odd building number within the 100 block of North Main Street. In this case the returned address will be "1?? N MAIN ST", the primary address is incomplete.
Example:
A phone number with mailable address:
Cust=XXXXXXXX&OID=0000000000000000001&
Type=TBNA&BTN=4012734037
&LastName=&FirstName=&Address=82 Tobey St&City=Providence&State=RI&ZipCode=02909&Verbal=
For a phone number without any information, the verbal field is populated with "Listing not available":
HTTP Response Status Header: 200 OK
Cust=XXXXXXXX&OID=0000000000000000001&
Type=TBNA&BTN=2140000000 &LastName=&FirstName=&Address=&City=&State=&ZipCode=&Verbal=
Listing not available
For a phone number with partial information, the Verbal field is populated with "Not Mailable":
HTTP Response Status Header: 200 OK
Cust=XXXXXXXX&OID=0000000000000000001&Type=TBNA&BTN=9729798865&LastName=&FirstName=
&Address=
&City=Dallas&State=TX&ZipCode=75212&Verbal=Not Mailable
Input Field Definitions:
   Cust: 8 bytes
   OID: 19 bytes unique id (alphanumeric)
   TransType: 3 bytes
   BTN: 10 digits phone number
Output Field Definitions:
   Cust: 8 bytes
   OID: 19 bytes unique id
   Type: 3 bytes
   BTN: 10 digits phone number
   LastName: max len of 20 bytes, for business name the max len is 55 bytes
   FirstName: max length of 20 bytes
   Address: max length of 42 bytes
   City: max length of 28 bytes
   State: max length of 2 bytes
   ZipCode: max length of 5 bytes
   Verbal:
   Listing not available—Address information is not available
   Not mailable—Not enough address data for mailing or question mark in address data.
   Time Out—No response from vendor within the millisecond threshold
   Link down—Network problem, please call Accudata
Error Messages
The following is a list of error messages that can be returned by the server:
Output Field Definitions:
   Cust: 8 bytes
   OID: 19 bytes unique id
   Type: 3 bytes
   BTN: 10 digits phone number
   Reply: Error
   Verbal: Invalid Customer number
   Invalid phone number
   Invalid Pin number
   Invalid Transaction Type
   NoCustomerID
   MissingOrBadOID
   InternalError—problem with software, please call MissingOrInvalidBtn
InvalidTransType
Example:
Response for Invalid Customer number:
HTTP Response Status Header: 200 OK
HTTP Body Content:
Cust=12&OID=0000000000000000009&Type=CNM&BTN=XXXXXXXXXX
&Reply=Error&Verbal=Invalid Customer Number
Response for Invalid phone number:
HTTP Response Status Header: 200 OK
HTTP Body Content:
Cust=XXXXXXXX&OID=0000000000000000009&Type=CNM&BTN=XXXX
XXXXXXX&Reply=Error&Verbal=MissingOrInvalidBtn Referring again to FIG. 1, the interface module 20 calls (5) a Linux function based on the HTTP request being sent to a particular server, potentially over the Internet 22. The Linux function then sends (6) out the HTTP request to the database or other repository 24 (which may be stored on a server (not shown) and accessed, for example, by inputting a URL as depicted above). The server may be a Line Information Database (LIDB) server, an Accuname server (which offers similar information as a LIDB server to provide CNAM data and LIDB data but is typically less expensive to access), or another server that builds an HTTP response and sends (7) the response to the interface module 20. The response is preferably an https response (but can be another type of response) and examples of such a response were described above.

The caller name is then sent (8) to the Asterisk platform 18 which sends (9) the name and the phone number to the second computer 26 where they are displayed via the phone calling software or capability 28. At this point, a connection (10) to allow voice, data, and/or multimedia data is established between the phone calling software or capability 14 and the phone calling software or capability 28 via the Asterisk platform 18.

Although an exemplary embodiment of the system and method of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, although the Asterisk platform was described herein, any other open source platform could be utilized without departing from the scope of the present invention. Further, a greater or lesser numbers of elements can be used in the request, different elements can be used in the request (for example, instead of an AsteriskCNM or CNAM, an Accuname request, which is a lower cost IP based alternative to CNAM, can be sent), the length of the elements can be altered (for example, a seven digit phone number can be used), the sources of the information that comprise the elements can differ, and the location of the elements can differ (for example, the interface module can be located partially in or apart from the Asterisk platform without departing from the scope of the present invention. Also, the information sent between various modules (including the originating source and the end office), can be sent between the modules via at least one of a data network, the Internet, an Internet Protocol network, a wireless source, and a wired source and via plurality of protocols.

What is claimed is:

1. A method, comprising:
receiving data sent from a device at an open source Private Branch Exchange (PBX) platform, wherein the received data is at least one of a phone number, email address or other identifier; and
sending, via an interface module invoked by the open source PBX platform, a secure HyperText Transfer Protocol (HTTP) Calling Name request to a data repository separate from the open source PBX platform when the received data is the phone number.

2. The method of claim 1, further comprising calling a function, by the interface module, based on the secure HTTP request.

3. The method of claim 2, wherein sending the secure HTTP request to a data repository comprises sending the secure HTTP request to a database.

4. The method of claim 3, further comprising receiving a response including the Calling Name to the secure HTTP request at the interface module.

5. The method of claim 4, further comprising receiving the Calling Name at the open source PBX platform.

6. The method of claim 5, further comprising sending, by the open source PBX platform, the Calling Name and the received phone number to a second device.

7. The method of claim 6, further comprising displaying the Calling Name and the received phone number on the second device.

8. The method of claim 7, further comprising establishing communication between the second device and the first device.

9. The method of claim 1, further comprising connecting, by a computer, to the open source Private Branch Exchange (PBX) platform, via a port, wherein the port comprises an IP (Internet Protocol) port.

10. The method of claim 9, further comprising monitoring the port, by the open source PBX platform, for any activity.

11. The method of claim 1, further comprising entering the phone number into a phone calling capability residing on the first device.

12. The method of claim 11, further comprising receiving the phone number at the open source PBX platform from the phone calling capability via the port.

13. The method of claim 1, wherein the interface module and the open source PBX platform reside on a server.

14. The method of claim 1, wherein communication is established between a plurality of devices.

15. The method of claim 1, wherein the interface module resides on the open source PBX platform.

16. The method of claim 1, further comprising building the secure HTTP request at the interface module invoked by the open source PBX platform.

17. A memory unit comprising instructions that, when executed by a machine, cause the machine to:
receive data at an open source PBX platform, wherein the received data is at least one of a phone number, email address or other identifier; and
send, via an interface module invoked by the open source PBX platform, a secure HyperText Transfer Protocol (HTTP) Calling Name request to a data repository separate from the open source PBX platform when the received data is the phone number.

18. The memory unit of claim 17, wherein the instructions further cause the machine to establish communication between at least two devices based on the received response.

19. A system, comprising:
a server comprising an open source Private Branch Exchange (PBX) platform; and an interface module;

wherein the open source PBX platform is configured to receive data sent by a device, wherein the received data is at least one of a phone number, email address or other identifier;

wherein the interface module is configured to send a secure HyperText Transfer Protocol (HTTP) Calling Name request to a data repository separate from the open source PBX platform when the received data is the phone number.

20. The system of claim 19 wherein the request comprises at least one of:

a CNAME transaction type that returns a Calling Name;

a TBNA transaction type that returns Name & Address data;

a WTN transaction type that checks for a Working Telephone Number;

a BNS transaction type that returns LIDB raw data; and a CC1 transaction type that returns Local Exchange Carrier (LEC) Calling Card data.

* * * * *